(12) United States Patent
Mathews et al.

(10) Patent No.: US 9,712,244 B2
(45) Date of Patent: *Jul. 18, 2017

(54) APPARATUS AND METHOD FOR EFFICIENT TWO-WAY OPTICAL COMMUNICATION WHERE TRANSMITTER MAY INTERFERE WITH RECEIVER

(71) Applicant: GOOGLE INC., Mountain View, CA (US)

(72) Inventors: Jeffrey P. Mathews, Longmont, CO (US); Jonathan S. Bruneau, Boulder, CO (US); Lee R. Taylor, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,541

(22) Filed: Aug. 8, 2016

(65) Prior Publication Data

US 2016/0352430 A1 Dec. 1, 2016

Related U.S. Application Data

(63) Continuation of application No. 14/474,926, filed on Sep. 2, 2014, now Pat. No. 9,413,463.
(Continued)

(51) Int. Cl.
*H04B 10/116* (2013.01)
*H04B 10/40* (2013.01)
(Continued)

(52) U.S. Cl.
CPC ........... *H04B 10/40* (2013.01); *H04B 10/116* (2013.01); *H04B 10/1143* (2013.01);
(Continued)

(58) Field of Classification Search
CPC .................................................... H04B 10/116
See application file for complete search history.

(56) References Cited

U.S. PATENT DOCUMENTS 7,352,930 B2 4/2008 Lowles
7,830,258 B2 11/2010 McAllister
(Continued)

OTHER PUBLICATIONS

Detailed Technical Specification of Security for Heterogeneous Access, May 31, 2002, 161 pgs, www.isrc.rhul.ac.uk/shaman/docs/d09v1.pdf.
(Continued)

*Primary Examiner* — Nathan Curs
(74) *Attorney, Agent, or Firm* — Morgan, Lewis & Bockius LLP

(57) ABSTRACT

A two-way optical communication apparatus includes a transmit element, a receive element and a transceive processor. The transmit and receive elements are coupled to a light pipe, and configured to transmit a first optical signal and receive a second optical signal, respectively. The transceive processor is configured to direct the transmit element to suspend transmitting the first optical signal during reception periods, and direct the receive element to sample for the second optical signal during sampling intervals within the reception periods. Each reception period lasts for a respective duration of time, and occurs in the first optical signal at a respective duty cycle. The receive element is configured to sense an ambient light level of the surrounding environment during the reception periods, and the transceive processor is configured to adjust the durations of time and the duty cycles of the reception periods according to the sensed ambient light level.

20 Claims, 4 Drawing Sheets

Related U.S. Application Data

(60) Provisional application No. 61/872,330, filed on Aug. 30, 2013, provisional application No. 61/918,716, filed on Dec. 20, 2013.

(51) Int. Cl.
*H04B 10/114* (2013.01)
*H04B 10/25* (2013.01)
*H04B 10/2507* (2013.01)
*H04B 10/50* (2013.01)

(52) U.S. Cl.
CPC ..... *H04B 10/2504* (2013.01); *H04B 10/2507* (2013.01); *H04B 10/502* (2013.01)

(56) References Cited

U.S. PATENT DOCUMENTS

| | | |
|---|---|---|
| 7,953,327 B2 | 5/2011 | Pereira et al. |
| 8,049,434 B2 | 11/2011 | Crouse et al. |
| 8,096,695 B2 | 1/2012 | Ong |
| 8,156,500 B2 | 4/2012 | Helander |
| 8,228,198 B2 | 7/2012 | McAllister |
| 8,265,674 B2 | 9/2012 | Choong et al. |
| 8,279,158 B2 | 10/2012 | Lowles et al. |
| 8,370,370 B2 | 2/2013 | Huang et al. |
| 8,406,819 B2 | 3/2013 | Steer et al. |
| 8,409,001 B2 | 4/2013 | Chang |
| 8,471,500 B2 | 6/2013 | Fletcher et al. |
| 8,508,465 B2 | 8/2013 | Broga et al. |
| 8,519,844 B2 | 8/2013 | Richey et al. |
| 8,576,276 B2 | 11/2013 | Bar-zeev et al. |
| 8,606,645 B1 | 12/2013 | Applefeld |
| 8,613,070 B1 | 12/2013 | Borzycki et al. |
| 8,688,392 B2 | 4/2014 | Tam et al. |
| 8,823,795 B1 | 9/2014 | Scalisi et al. |
| 9,009,805 B1 | 4/2015 | Kirkby et al. |
| 9,207,659 B1 | 12/2015 | Sami |
| 2002/0016639 A1 | 2/2002 | Smith et al. |
| 2003/0061284 A1 | 3/2003 | Mandarino et al. |
| 2003/0169728 A1 | 9/2003 | Choi |
| 2006/0174102 A1 | 8/2006 | Smith et al. |
| 2006/0259183 A1 | 11/2006 | Hayes et al. |
| 2008/0037444 A1 | 2/2008 | Chhabra |
| 2008/0089300 A1 | 4/2008 | Yee |
| 2008/0122606 A1* | 5/2008 | Bradley .............. B60Q 1/0017 340/468 |
| 2008/0219672 A1 | 9/2008 | Tam et al. |
| 2009/0080896 A1 | 3/2009 | Pereira et al. |
| 2009/0244097 A1 | 10/2009 | Estevez |
| 2010/0068997 A1 | 3/2010 | Dunko |
| 2010/0141153 A1 | 6/2010 | Recker et al. |
| 2010/0192212 A1 | 7/2010 | Raleigh |
| 2010/0283584 A1 | 11/2010 | McAllister |
| 2011/0107364 A1 | 5/2011 | Lajoie et al. |
| 2011/0121654 A1 | 5/2011 | Recker et al. |
| 2011/0172844 A1 | 7/2011 | Choong et al. |
| 2011/0199004 A1 | 8/2011 | Henig et al. |
| 2011/0202151 A1 | 8/2011 | Covaro et al. |
| 2012/0011567 A1 | 1/2012 | Cronk et al. |
| 2012/0049765 A1 | 3/2012 | Lu et al. |
| 2012/0082062 A1 | 4/2012 | McCormack |
| 2012/0216296 A1 | 8/2012 | Kidron |
| 2013/0026947 A1 | 1/2013 | Economy et al. |
| 2013/0041516 A1 | 2/2013 | Rockenfeller et al. |
| 2013/0076491 A1 | 3/2013 | Brandsma et al. |
| 2013/0086665 A1 | 4/2013 | Filippi et al. |
| 2013/0236183 A1* | 9/2013 | Chao ................. H05B 33/0827 398/101 |
| 2013/0268357 A1 | 10/2013 | Heath |
| 2013/0276140 A1 | 10/2013 | Coffing et al. |
| 2013/0340050 A1 | 12/2013 | Harrison |
| 2014/0007222 A1 | 1/2014 | Qureshi et al. |
| 2014/0068705 A1 | 3/2014 | Chambers et al. |
| 2014/0068789 A1 | 3/2014 | Watts et al. |
| 2014/0137188 A1 | 5/2014 | Bartholomay et al. |
| 2014/0157370 A1 | 6/2014 | Plattner et al. |
| 2014/0173692 A1 | 6/2014 | Srinivasan et al. |
| 2014/0189808 A1 | 7/2014 | Mahaffey et al. |
| 2014/0245411 A1 | 8/2014 | Meng et al. |
| 2014/0245461 A1 | 8/2014 | O'Neill et al. |
| 2014/0282877 A1 | 9/2014 | Mahaffey et al. |

OTHER PUBLICATIONS

Google Inc., International Search Report and Written Opinion, PCT/US2015/053291, Feb. 5, 2016, 18 pgs.

Google Inc., International Search Report and Written Opinion, PCT/US2015/060405, Feb. 25, 2016, 9 pgs.

* cited by examiner

OPTICAL COMMUNICATION DEVICE

APPARATUS FOR FULL DUPLEX OPTICAL COMMUNICATION

TRANSCIEVE APPARATUS FOR FULL DUPLEX OPTICAL COMMUNICATION

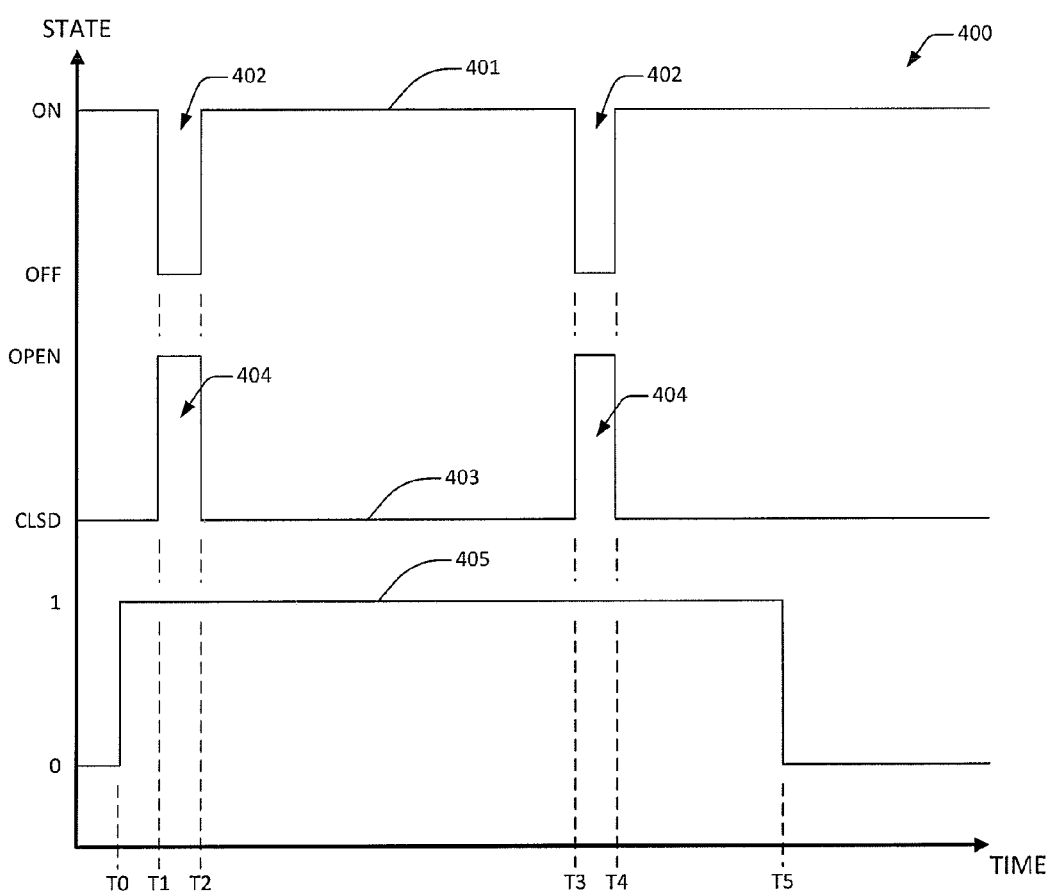

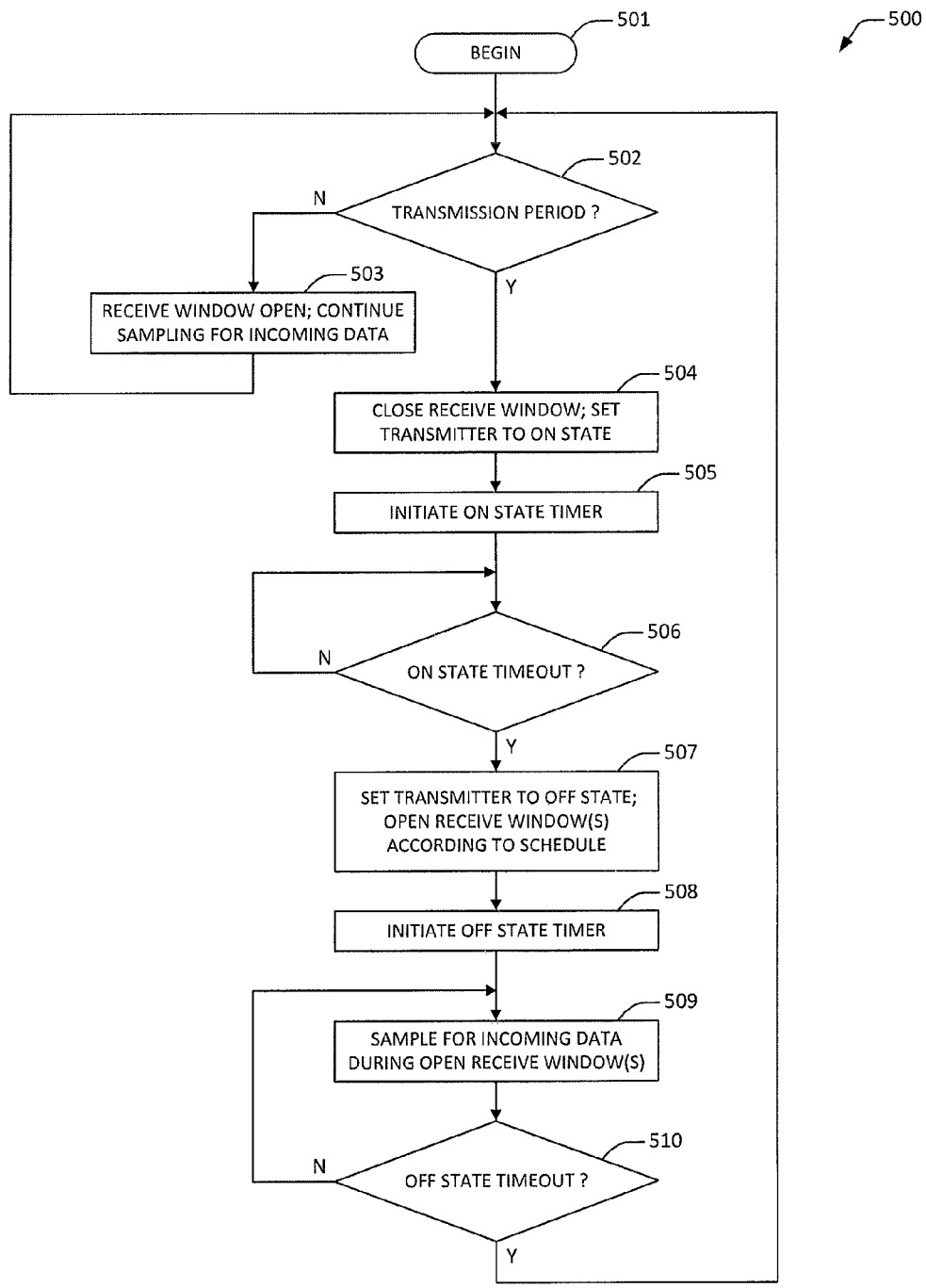

APPARATUS AND METHOD FOR EFFICIENT TWO-WAY OPTICAL COMMUNICATION WHERE TRANSMITTER MAY INTERFERE WITH RECEIVER

RELATED APPLICATIONS

This application is a continuation of U.S. patent application Ser. No. 14/474,926, filed on Sep. 2, 2014, entitled, "Apparatus and Method for Efficient Two-Way Optical Communication Where Transmitter May Interfere with Receiver," which claims priority to U.S. Patent Application Ser. No. 61/872,330, filed on Aug. 30, 2013, entitled, "Apparatus and Method for Efficient Two-Way Optical Communication Where Transmitter May Interfere with Receiver," and U.S. Patent Application Ser. No. 61/918,716, filed on Dec. 20, 2013, entitled, "Apparatus and Method for Efficient Two-Way Optical Communication Where Transmitter May Interfere with Receiver." Each of these applications is hereby incorporated by reference in its entirety.

TECHNICAL FIELD

This invention relates in general to the field of electronic devices, and more particularly to an apparatus and method that provides for efficient two-way optical communication where an optical transmitter may interfere with a corresponding optical receiver.

BACKGROUND

It would be very difficult today to find a consumer electronic device which does not have one or more light emitting diodes (LEDs) disposed therein to indicate status (e.g., on, off, message waiting, etc.) to a user. LED indicators are used not only in consumer devices, but also in devices in the business and transportation realms.

As a result, a significant amount of attention in the art has been devoted to decreasing the cost of manufacture of devices with one or more LED indicators. More specifically, light pipes (also referred to as "light tunnels" or "light tubes") have been developed to enable the light from one or more LEDs mounted on a circuit board in a device to be transported efficiently to an area of a display where the light is required, thus eliminating a significant amount of hand labor that would otherwise be required to fabricate a product. As one skilled in the art will appreciate, light pipes are generally manufactured from plastic materials that transport light via a reflective lining, or transparent solids that transport the light by total internal reflection. As such, the pipes, according to configuration, are snapped into place on a circuit board, and the board is mounted behind a panel or display.

In addition to being used to display state or status of a given device, light pipes are used to receive light transmitted from outside of the given device and to route the light to light sensors internal to the given device. Such an application can be as simple as sensing ambient light in order to control brightness of a display, or it may be more complex, such as receiving an optical commissioning data stream from another device in order to configure the given device for operation.

For devices that require two-way (i.e., transmit and receive) optical communication, like lower frequency devices, it is important to isolate transmit circuits from receive circuits in order to preclude the transmit circuits from interfering with the receive circuits. In many instances, isolation amounts to placement of opaque materials such as black tape in more prevalent interference paths. But the isolation issue becomes much more prevalent when a single light pipe is shared by transmit and receive circuits, as is the case in consumer devices where size and weight are critical design constraints.

To address isolation in a shared light pipe, one approach requires that transmit circuits and receive circuits be of such disparate optical wavelengths that transmissions from the transmit circuits are essentially undetectable by the receive circuits. But this approach is not very practical in consumer devices that employ inexpensive optical sensors (e.g., photodiodes) that sense over a broad optical spectrum.

As a result, special purpose light pipes have been developed that route light to/from a single position on a display, but that allow for separation of a corresponding light source and light sensor that share a single light pipe. For example, in U.S. Pat. No. 7,352,930, Lowles discloses a shared light pipe for message indicator and light sensor on a mobile communication device that is of the so-called "Y configuration." A transmit circuit is disposed on one leg of the Y and a receive circuit is disposed on the other leg of the Y, thus allowing for separation between the transmit circuit and the receive circuit, and also allowing space to place masking material between the circuits. Interference is still significant within the pipe, and Lowles teaches that it is prudent to only sense light when the light is not being transmitted by the transmit circuit, unless it is desired to confirm the presence of the transmit circuit. Such a configuration, however, is simplistic in nature, and does not lend itself to applications other than using a shared light pipe to sense light when a message waiting indicator is not on.

More particularly, consider a situation where it may be required to employ a shared light pipe to transmit constant illumination or a blinking indicator, while simultaneously being required to receive an optical data stream from, say, a commissioning device or a controller. To employ Lowle's technique would require an inordinate amount of time to receive the optical stream, or it would require that the optical stream bit rate be on the order of minutes.

Accordingly, what is required is an apparatus and method that provides for two-way optical communication using a shared light pipe that supports optical bit rates much faster than what has been heretofore provided, where transmissions must be reliably perceived by a user (i.e., the human eye).

In addition, what is needed is a mechanism that provides a constant illumination or visibly perceptible indication of device state, which may also receive an optical data stream via a shared light pipe.

Finally, what is needed is a method for using a shared light pipe to transmit illumination or visibly perceptible device state to a user, while simultaneously receiving optical data from another device.

SUMMARY

The present invention, among other applications, is directed to solving the above-noted problems and addresses other problems, disadvantages, and limitations of the prior art. The present invention provides a superior technique for two-way optical communication via a shared light pipe. In one embodiment, an apparatus provides for two-way optical communication. The apparatus includes a transmit element, a receive element, and a transceive processor. The transmit element is coupled to a light pipe, and is configured to transmit a first optical signal through the light pipe. The receive element is also coupled to the light pipe, and is configured to receive a second optical signal through the light pipe. The transceive processor is coupled to the transmit and receive elements, and is configured to direct the transmit element to pause and then resume transmitting the first optical signal during first intervals, and is configured to direct the receive element to sample for the second optical signal during one or more second intervals within each of the first intervals, where the each of the first intervals is less than a first value and the first intervals occur at a duty cycle no greater than a second value, and where the first and second values are controlled by the transceive processor such that a user perceives the first optical signal as having a constant state for a third interval.

One aspect of the present invention contemplates an apparatus for providing two-way optical communication. The apparatus has a light pipe, a transmit element, a receive element, and a transceive processor. The light pipe is configured to transport illumination from optical signals between ends of the light pipe. The transmit element is coupled to a first one or the ends, and is configured to transmit a first optical signal through the light pipe to a second one of the ends. The receive element is coupled to the light pipe, and is configured to receive a second optical signal transported through the light pipe from the second one of the ends. The transceive processor is coupled to the transmit and receive elements, and is configured to direct the transmit element to pause and then resume transmitting the first optical signal during first intervals, and is configured to direct the receive element to sample for the second optical signal during one or more second intervals within each of the first intervals, where the each of the first intervals is less than a first value and the first intervals occur at a duty cycle no greater than a second value, and where the first and second values are controlled by the transceive processor such that a user perceives the first optical signal as having a constant state for a third interval.

Another aspect of the present invention comprehends a method for providing two-way optical communication in a shared light pipe. The method includes: via a transmit element, transmitting a first optical signal through the shared light pipe; pausing and then resuming the transmitting during first intervals, where each of the first intervals is less than a first value and the first intervals occur at a duty cycle no greater than a second value, and where the first and second values are controlled by a transceive processor such that a user perceives the first optical signal as having a constant state for a third interval; and via a receive element, receiving a second optical signal through the shared light pipe during one or more second intervals within each of the first intervals.

BRIEF DESCRIPTION OF THE DRAWINGS

These and other objects, features, and advantages of the present invention will become better understood with regard to the following description, and accompanying drawings where:

FIG. 4 is a timing diagram showing an optical communication multiplexing technique according to the present invention; and FIG. 5 is a flow diagram illustrating a method according to the present invention for full duplex optical communication via a shared light pipe.

DESCRIPTION OF IMPLEMENTATIONS

Figure 1:
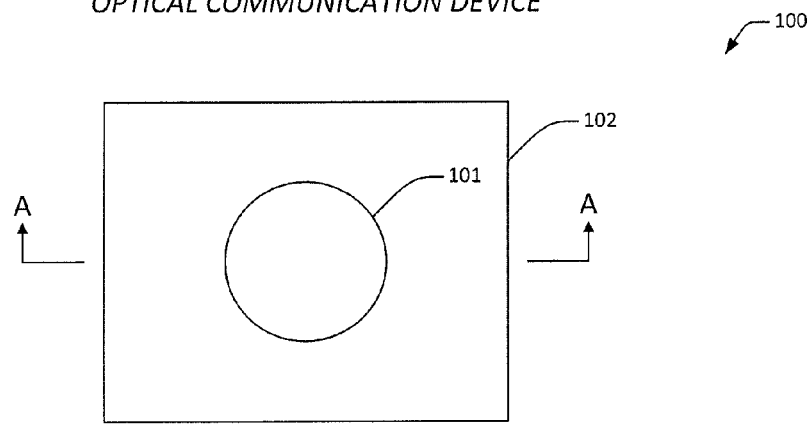
FIG. 1 is a diagram illustrating a frontal view of an electronic device according to the present invention.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

DEFINITIONS

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

In view of the above background discussion on light pipes and associated techniques employed within present day electronic devices for enabling full duplex optical communication, a discussion of the present invention will now be presented with reference to FIGS. 1-5.

Referring to FIG. 1, a diagram is presented illustrating a frontal view of an electronic device 100 according to the present invention. Such a device 100 may be found in virtually every household and business configured as a personal item (e.g., an appliance, an entertainment device, a cell phone, or tablet computer) or as a device disposed in a transportation vehicle (e.g., automobile, train, airplane, ship, etc.) in which it is required to provide for full duplex optical communication with a user, another device, or a user and another device, where the electromagnetic frequency range for optical communication may include the visible, ultraviolet, and infrared spectrums.

The device 100 may include a housing 102 for enclosing electromechanical components (not shown) therein. As is alluded to above, a desirable configuration for providing optical communication via the device 100 may include use of a light pipe 101 that projects through a correspondingly shaped interstice in the housing 102. The light pipe 101 may be covered by a translucent lens or cover (not shown) to provide for filtering, shading, dispersion, etc.

The information transmitted optically via the light pipe (also known as a "light tunnel" or "light tube") may be merely illumination to provide an optically suitable environment for performing other activities. The information transmitted may be indication of the state of the device 100 (e.g., on, off, powering up, message waiting, etc.) or may comprise optically encoded data that is transmitted to a user or to another device (e.g., configuration information, commissioning information, control commands and responses, etc.).

The device 100 may comprise a plurality of light pipes 101 of various optical frequencies in accordance with functions of the device 100, however, for simplicity sake within the present application, illustration of a single light pipe 101 will suffice.

In terms of configuration, the light pipe 101 may be rigid or flexible, as is appreciated by those in the art, and may comprise smooth hollow structures, generally fabricated from plastic materials, that contain light with a reflective lining, or transparent solids that contain the light by total internal reflection.

Light pipes, such as the pipe 101 of FIG. 1, are commonly used in an electronic device 100 to direct illumination from light sources (e.g., light emitting diodes (LEDs)) mounted on a circuit board to indicators and/or backlit controls (e.g., buttons, switches, dials, etc.). Light pipes 101 facilitate cost-effective fabrication of the device 100 by enabling all light sources to be mounted on a single circuit board, where light from each of the light sources may be directed up and away from the board to where illumination is required. Light pipes 101 may be purchased in a variety of configurations that may include tens of light pipes 101 fabricated together in a single module.

Another common use of a light pipe 101 is for reception of optically transmitted data. In this application area, rather than directing light from light sources within the device 100 to the outside of the housing 102, light is directed from outside of the housing 102 through the light pipe 101 to optical reception circuits (e.g., photodiodes, phototransistors, etc.) (not shown) disposed within the housing 102. The optical reception circuits may be employed to sense ambient optical conditions around the device 100, or they may be employed to receive optically encoded information (e.g., commissioning data, maintenance data, control data, etc.) that is transmitted by another device.

As one skilled in the art will appreciate, the cost of an electronic device 100 that employs light pipes 101 may be markedly less than other forms of manufacture since costly hand labor is not generally required to mount multiple light sources on a single circuit board along with a single rigid light tube that is employed to transport the multiple light sources to a display that is removed from the circuit board by several inches.

Manufacturing ease notwithstanding, one skilled in the art will also appreciate that size and weight considerations are also paramount when developing consumer electronics, and thus an essential design constraint for these electronics requires minimization of parts count, including light pipes 101. Accordingly, prior art mechanisms have been developed to allow a single light pipe 101 to both transmit and receive optical information, as is noted to above. However, the present inventors have observed that these present day mechanisms are limited in their applications. More specifically, these mechanisms do not allow for two-way optical communication under conditions in which a light source must be either employed for continuous illumination or employed to indicate a visibly recognizable state (e.g., "ON", blinking to indicate operations are occurring, etc.) to a user. Consequently, the constraints that illumination/state conditions be visibly recognizable to a user (i.e., the human eye) may preclude use of the light pipe 101 for two-way communications because the light source is required to be continuously on or it must be on for relatively long periods of time (e.g., 500 milliseconds) from a communications perspective. This limitation is thus disadvantageous for many types of emerging consumer devices.

Another limitation associated with use of a shared light pipe 101 arises as a result of unintended interference resulting from transmitted light reflections into a receiving sensor that shares the light pipe 101 with a transmitting element.

The present invention overcomes the above noted limitations, and others, by providing a shared light pipe mechanism that allows for full duplex optical communication under conditions in which it is required to provide constant illumination and/or visibly recognizable state indication. As will be described below with reference to FIGS. 2-5, the present inventors have noted that the so-called persistence of vision effect in humans may be exploited to enable a shared light pipe 101 to be employed to transmit a constant illumination or visibly recognizable state indication, as perceived by the human eye, while simultaneously allowing for windows of receptive optical sampling during reception periods less than a human flicker fusion threshold. Practically speaking, the present inventors have determined that these reception periods should be roughly no greater than 40 milliseconds and should occur at an approximately 10 percent duty cycle. That is, during the period ("transmission period") for which it is required to provide constant illumination or visibly recognizable state indication, one or more reception periods of roughly no greater than 40 milliseconds may be scheduled at a maximum of an approximately 10 percent duty cycle. For example, if the device 100 has a transmission period of 500 milliseconds, according to the present invention, five 10-millisecond reception periods may be opened every 100 milliseconds. By exploiting persistence of vision in this manner in a device 100 according to the present invention, optical communication may occur between two devices or two devices and a user.

In addition to providing for perceived full duplex optical communication via a shared light pipe 101, the present invention lends itself well to consumer electronics devices that include a light pipe 101 comprising an optical transmitter (i.e., a light source such as, but not limited to, an LED) and optical receiver (i.e., a light sensor such as, but not limited to, a photodiode, photoresistor, or phototransistor) that are located in proximity such that the optical properties of a corresponding light pipe cause a reflection of the transmitter's data into the receiver.

Figure 2:
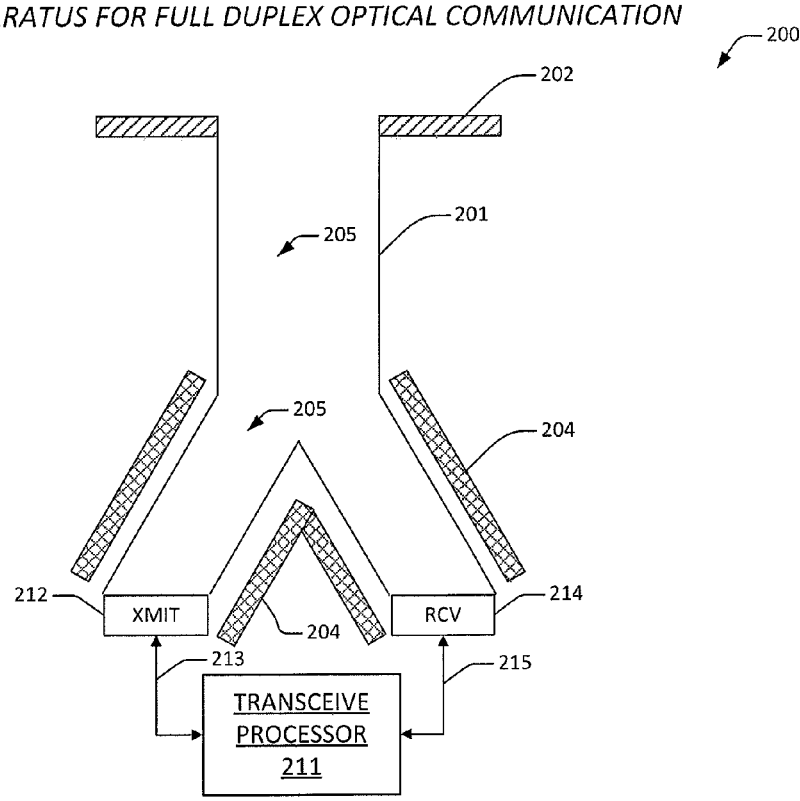
FIG. 2 is a cutaway view of an embodiment the electronic device of FIG. 1 taken along axis A-A.

Now referring to FIG. 2, a cutaway view 200 is presented of an embodiment the electronic device 100 of FIG. 1 taken along axis A-A. The device 100 may include a housing 202 having a light pipe 201 of the well-known Y configuration that is disposed through a corresponding interstice in the housing 202. The light pipe 201 may be configured as is described above having an internal reflective surface 205 that allows for transmission of light from an optical transmitter 212 to outside of the housing 202 and for reception of light from outside the housing 202 into an optical receiver 214. The device 100 may further include an optical barrier 204 embodied as black tape or paint as shown in FIG. 2 to optically isolate transmit and receive paths within the light pipe 201 by minimizing unintended reflections from the transmitter 212 into the receiver 214.

The device 100 may further comprise a transceive processor 211 that is coupled to the transmitter 212 via bus 213 and to the receiver 214 via bus 215. In one embodiment, the transmitter 212 may be disposed as a light source such as, but not limited to, an LED that receives a voltage or current via bus 213 and responsively emits light in a wavelength within the optical frequency range as noted above. In one embodiment, the receiver 214 may be disposed as a light sensor such as, but not limited to, a photodiode or phototransistor that receives light via the light pipe 201 and that converts the light into a corresponding voltage or current, which is provided to the transceive processor 211 via bus 215.

In operation, the transmitter 212 is employed generally for communication with a human eye (not shown) that exploits the persistence of vision effect. During periods where a light transmitted through the interstice is required to be perceived by the eye as being on, the transceive processor 211 directs the transmitter 212 via bus 213 to turn off for one or more reception periods that are imperceptible to the eye, as is described above, and during the one or more reception periods the transceive processor 211 samples the output of the receiver 214 via bus 215. Accordingly, incoming optical data may be sampled while still providing for a perceived constant illumination or visibly recognizable state indication. The present inventors note that the perceived constant illumination/state indication may also be employed as part of a modulated transmission from the device 100 to the human eye. For example, a 500 millisecond transmission interval time followed by a 500 millisecond period when the transmitter 212 is off may be used to indicate a status message to the human eye. Accordingly, the receiver 215 may be sampled by the transceive processor 211 during the 500 millisecond period when the transmitter 212 is off, and also during the 500 millisecond transmission period, but during the 500 millisecond transmission period, one or more reception periods as described above are controlled by the transceive processor 211 to continue to allow for sampling of incoming optical data.

In one embodiment, the transceive processor 211 may schedule 1-millisecond reception periods every 10 milliseconds during transmission intervals, though the present inventors note that desired values for the reception interval and duty cycle may be established via programming in closed loop fashion, or they may be fixed based on the characteristics of the transmitter 212, the receiver 214, and intended functions of the device 100.

In another embodiment, the device 100 may be employed to transmit and receive optical data to/from a corresponding optical device (not shown) rather than to the human eye, where the bit rate of the transmitted data is substantially higher than the bit rate of the data transmitted by the corresponding optical device. Accordingly, while scheduling reception periods as described above within the device 100 for sampling of the receiver 214 during transmission intervals, the corresponding optical device may sample for data that is transmitted by the device 100 without unacceptable sampling errors since the bit rate of data transmitted by the device 100 is substantially higher. In one embodiment, the transmitted bit rate of the device 100 is at least 10 times that of the corresponding optical device.

The present inventors note that reception intervals and associated duty cycles may be dynamically changed by the transceive processor 211 according to ambient light level of the environment around the device 100. During reception periods when the receiver 214 is sampling for incoming optical data, an analog light intensity reading may also be taken by components within the receiver 214. In this way the device 100 may sense ambient light level of the surrounding environment and, as a result of changing ambient light level, the transceive processor 211 may employ the analog intensity value to adjust the reception intervals and duty cycles as a function of the surrounding environment, thus enabling the device 100 to decrease/increase perceived brightness of the transmitted light and achieve a balanced cosmetic appearance to users in both direct sunlight and darkened rooms. To the casual observer, such real-time adjustments are not immediately noticeable; however, the present inventors not that such modifications to reception intervals and duty cycles may be employed to mask undesirable mechanical structures within the device 100 along with cast shadows of metallic, fiberglass, and/or plastic internal components within the device 100, which would otherwise be particularly noticeable when the device 100 is utilized in a dark room. The present inventors also note that adjusting the reception intervals and duty cycles not only provides cosmetic and aesthetic benefits, but also energy savings, and ambient optical noise immunity when required.

The transceive processor 211 according to the present invention is configured to perform the functions and operations as discussed above. The transceive processor 211 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the transceive processor 211 may be shared with other circuits, microcode, etc., that are employed to perform other functions and/or operations within the transceive processor 211. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC)

microprocessor. For a complex instruction set computer (CISC) microprocessor, complex instructions are translated into associated micro instructions, and the associated micro instructions are directly executed by a unit or units within the CISC microprocessor.

The transceive processor 211 may comprise a microprocessor or other central processing unit (CPU) that executes one or more application programs disposed in a memory (not shown) to perform the transmission and reception functions described above. The memory may be either internal or external to the CPU. The transceive processor 211 may further comprise additional electronic circuits (e.g., digital-to-analog converters, analog-to-digital converters) configured to couple the microprocessor/CPU to the transmitter 212 and receiver 214 via respective busses 213, 215.

Figure 3:
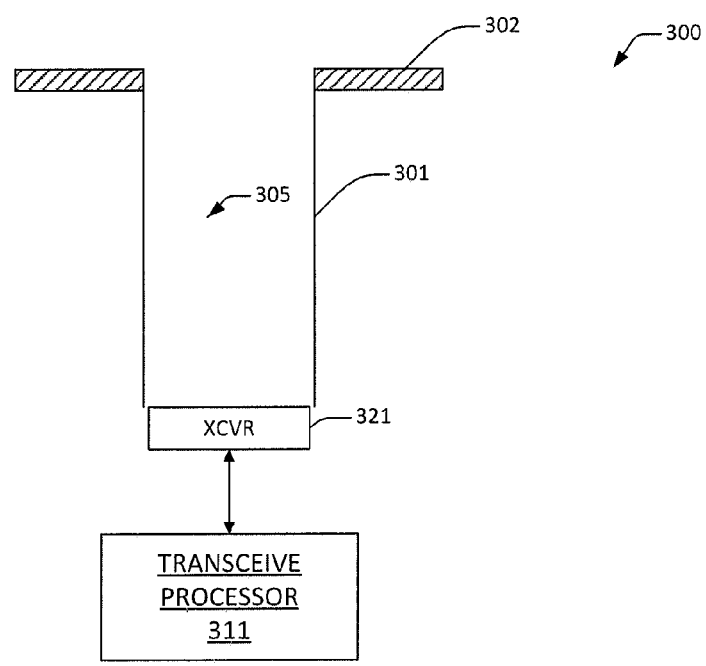
FIG. 3 is a cutaway view of an alternative embodiment the electronic device of FIG. 1 taken along axis A-A.

Turning to FIG. 3, a diagram 300 is presented of a cutaway view of an alternative embodiment the electronic device 100 of FIG. 1 taken along axis A-A. The device 100 may include a housing 302 having a light pipe 301 that is disposed through a corresponding interstice in the housing 302. The light pipe 301 may be configured as is described above having an internal reflective surface 305 that allows for transmission/reception of light from/to an optical transceiver 321 that may be employed to transmit and receive optical signals.

The device 100 may further comprise a transceive processor 311 that is coupled to the transceiver 321. In one embodiment, the transceiver 321 may comprise a combined light source and light sensor, as these elements are described with reference to FIG. 2, disposed in relative proximity to the light pipe 301. In another embodiment, the transceiver 321 may comprise a separate light source and light sensor, with no optical barrier in between them. In contrast to the embodiment of FIG. 2, the source and sensor share the same internal reflective surface 305 within the light pipe 301 rather than being configured as a Y.

In operation, optical transmit and receive elements within the transceiver 321 function substantially as like elements are described above with reference to FIG. 2, except that the transmit and receive elements within the transceiver 321 share the same reflective surface 305 within the pipe. Consequently, it is impractical to employ masking material to minimize unintended reflections from transmit element to receive element. However, because the technique according to the present invention employs the persistence of vision effect, two-way communication is enabled at the device 100 to a user and from another device, or between the device 100 and another device, as is described above.

During periods where a light transmitted through the interstice is required to be perceived by the eye as being on, the transceive processor 311 directs the transmit element within the transceiver 321 to turn off for one or more reception periods that are imperceptible to the eye, as is described above, and during the one or more reception periods the transceive processor 321 samples the output of the receive element within the transceiver 321. Accordingly, incoming optical data may be sampled while still providing for a perceived constant illumination or visibly recognizable state indication. In addition, the perceived constant illumination/state indication may also be employed as part of a modulated transmission from the device 100 to the human eye. For example, a 500 millisecond transmission interval time followed by a 500 millisecond period when the transmit element is off may be used to indicate a status message to the human eye. Accordingly, the receive element may be sampled by the transceive processor 321 during the 500 millisecond period when the transmit element is off, and also during the 500 millisecond transmission period, but during the 500 millisecond transmission period, one or more reception periods as described above are controlled by the transceive processor 311 to continue to allow for sampling of incoming optical data.

In one embodiment, the transceive processor 311 may schedule 1-millisecond reception periods every 10 milliseconds during transmission intervals, though the present inventors note that desired values for the reception interval and duty cycle may be established via programming in closed loop fashion, or they may be fixed based on the characteristics of the transceiver 321, and intended functions of the device 100.

In another embodiment, the device 100 may be employed to transmit and receive optical data to/from a corresponding optical device (not shown) rather than to the human eye, where the bit rate of the transmitted data is substantially higher than the bit rate of the data transmitted by the corresponding optical device. Accordingly, while scheduling reception periods as described above within the device 100 for sampling of the receiver element during transmission intervals, the corresponding optical device may sample for data that is transmitted by the device 100 without unacceptable sampling errors since the bit rate of data transmitted by the device 100 is substantially higher. In one embodiment, the transmitted bit rate of the device 100 is at least 10 times that of the corresponding optical device.

The present inventors note that reception intervals and associated duty cycles may be dynamically changed by the transceive processor 311 according to ambient light level of the environment around the device 100. During reception periods when the transceive processor 311 is sampling the receive element for incoming optical data, an analog light intensity reading may also be taken by components within the transceiver 321. In this way the device 100 may sense ambient light level of the surrounding environment and, as a result of changing ambient light level, the transceive processor 311 may employ the analog intensity value to adjust the reception intervals and duty cycles as a function of the surrounding environment, thus enabling the device 100 to decrease/increase perceived brightness of the transmitted light and achieve a balanced cosmetic appearance to users in both direct sunlight and darkened rooms.

The transceive processor 311 according to the present invention is configured to perform the functions and operations as discussed above. The transceive processor 311 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the transceive processor 311 may be shared with other circuits, microcode, etc., that are employed to perform other functions and/or operations within the transceive processor 311. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor, complex instructions are translated into associated micro instructions, and the associated micro instructions are directly executed by a unit or units within the CISC microprocessor.

The transceive processor 311 may comprise a microprocessor or other central processing unit (CPU) that executes one or more application programs disposed in a memory (not shown) to perform the transmission and reception functions described above. The memory may be either internal or external to the CPU. The transceive processor 311 may further comprise additional electronic circuits (e.g., digital-to-analog converters, analog-to-digital converters) configured to couple the microprocessor/CPU to the transceiver 321.

Turning now to FIG. 4, a timing diagram 400 is presented showing an optical communication multiplexing technique according to the present invention. The diagram 400 depicts a transmit signal 401, such as may be provided by the transceive processor 211, 311 of FIGS. 2-3 to direct the transmitter 212 or transmit element within the transceiver 321 to transmit light into the light pipe 201, 301. The diagram 400 also shows a receive signal 403, such as may be provided by the transceive processor 211, to direct the receiver 214 or receive element within the transceiver 321 to sample light received into the light pipe 201, 301 from another device. The diagram 400 further includes an incoming optical signal 405, such as may be transmitted by another device into the light pipe 201, 301. The diagram 400 depicts a scenario where the light source of the device 100 is to be perceived by the user as being illuminated, that is, a scenario where the transmission interval is greater than the time depicted in the diagram 400.

Operationally, to maintain persistence to the human eye, in one embodiment, the transceive processor 211, 311 controls the states of the transmit and receive signals 401, 403 according to configuration of the reception intervals and duty cycles within the transceive processor 211, 311. Reception periods 402, 404 occur between times T1 and T2, and between times T3 and T4, where the transmit signal is in an off state and the receive signal is in an open state. The present inventors note that the period that the transmit signal 401 is in an off state indicates the reception interval and the period between off states of the transmit signal 401 indicates the duty cycle. Accordingly, though the receive signal 403 is shown in an open period 404 approximately equal to the period when the transmit signal 401 is off, the present invention allows for a plurality of open periods 404 within the reception interval 402 to provide for sampling of the incoming signal 405.

Referring now to FIG. 5, a flow diagram 500 is presented illustrating a method according to the present invention for full duplex optical communication via a shared light pipe, such as the light pipe 201, 301 of FIGS. 2-3. Flow begins at block 501, where a device 100 according to the present invention is operating to communicate illumination or state condition to a user. Flow then proceeds to decision block 502.

At decision block 502, an evaluation is made to determine if a transmitter within the device 100 is required to be perceived by the user as being on. If not, then flow proceeds to block 503. If so, then flow proceeds to block 504.

At block 503, one or more receive windows are allowed to be opened to sample for incoming optical data received by the light pipe 201, 301. Flow then proceeds to decision block 502.

At block 504, a receive window, if open, is closed, and the transmitter is set to an on state to provide light through the light pipe 201, 301. Flow then proceeds to block 505.

At block 505, a transmitter on state timer is initiated. In one embodiment, the on state timer is approximately 90 percent of the duty cycle corresponding to a reception interval for the device 100. Flow then proceeds to decision block 506.

At decision block 506, an evaluation is made to determine if the on state timer has timed out. If not, then flow proceeds to decision block 506. The transmitter remains in an on state and no receive sampling is allowed.

At block 507, the transmitter is set to an off state, ceasing illumination, and one or more receive windows may be opened according to device function in order to sample incoming optical signals. Flow then proceeds to block 508.

At block 508, a transmitter off state timer is initiated. The value of the off state timer defines the reception interval for the device 100, and the value of the off state timer divided by the sum of the off state and on state timers determines the duty cycle for the device. Flow then proceeds to block 509.

At block 509, incoming light is sampled from the light pipe 201, 301 during one or more receive windows that occur during the reception interval defined by the off state timer. During the one or more receive windows, the incoming light may be sampled one or more times. Flow then proceeds to decision block 510.

At decision block 510, an evaluation is made to determine if the off state timer has timed out, thus ending the reception interval. If not, then flow proceeds to block 509. If so, then flow proceeds to block 502.

The method continues until such time as the device 100 is placed in an inoperative state or turned off.

Although the present invention and its objects, features, and advantages have been described in detail, other embodiments are encompassed by the invention as well. For example, the transceive processor 211, 311 may be configured such that high bit rate data may be transmitted during the periods outside of when receive sampling windows are open (404 in FIG. 4) at a rate imperceptible to the human eye such that the light source is perceived to be either on or off for these periods, as is appropriate for indicated function. In this embodiment, the device 100 transmits optical data at a bit rate that is substantially faster than the bit rate which it samples during the reception intervals.

Alternatively, a data encoding scheme may be employed to allow for transmit waveforms from the device 100 where short duration transmitter off periods are not construed by a receiving device as being off, that is, interpreted as a logical zero. In this alternative scheme, the device 100 may transmit optical data at a bit rate that is substantially slower than the receiving device's bit rate which is sampled by the device 100.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for providing two-way optical communication, the apparatus comprising:
 a transmit element, coupled to a light pipe, configured to transmit a first optical signal through said light pipe;
 a receive element, also coupled to said light pipe, configured to receive a second optical signal through said light pipe; and
 a transceive processor, coupled to said transmit and receive elements, configured to direct said transmit element to suspend transmitting said first optical signal during a plurality of reception periods, and configured to direct said receive element to sample for said second optical signal during one or more sampling intervals within each of said reception periods, wherein:
 each of the plurality of reception periods lasts for a respective duration of time, and occurs in the first optical signal at a respective duty cycle; and
 the receive element is configured to sense an ambient light level of the surrounding environment during the reception periods, and the transceive processor is configured to adjust the durations of time and the duty cycles of the reception periods according to the sensed ambient light level.

2. The apparatus of claim 1, further comprising:
 an optical barrier, coupled to the light pipe, configured to at least partially isolate transmit and receive optical paths within split portions of the light pipe.

3. The apparatus of claim 1, wherein said first and second optical signals share the entire length of the light pipe.

4. The apparatus of claim 1, wherein said transmit element comprises a light emitting diode.

5. The apparatus of claim 3, wherein said receive element comprises a phototransistor.

6. The apparatus of claim 1, wherein for said each of the plurality of reception periods, the respective duration of time is no greater than a first threshold value, and the respective duty cycle is no greater than a second threshold value.

7. The apparatus of claim 5, wherein the first threshold value is equal to 40 milliseconds, and the second threshold value is equal to 10 percent.

8. The apparatus of claim 1, wherein said transceive processor is configured to direct said transmit element to transmit optical data in the first optical signal during periods outside of the plurality of reception periods, and wherein said optical data is transmitted at a bit rate faster than a threshold optical data bit rate.

9. An apparatus for providing two-way optical communication, the apparatus comprising:
 a light pipe, configured to transport illumination from optical signals between ends of said light pipe;
 a transmit element, coupled to a first one or said ends, configured to transmit a first optical signal through said light pipe to a second one of said ends;
 a receive element, coupled to said light pipe, configured to receive a second optical signal transported through said light pipe from said second one of said ends; and
 a transceive processor, coupled to said transmit and receive elements, configured to direct said transmit element to suspend transmitting said first optical signal during a plurality of reception periods, and configured to direct said receive element to sample for said second optical signal during one or more sampling intervals within each of said reception periods, wherein:
 each of the plurality of reception periods lasts for a respective duration of time, and occurs in the first optical signal at a respective duty cycle; and
 the receive element is configured to sense an ambient light level of the surrounding environment during the reception periods, and the transceive processor is configured to adjust the durations of time and the duty cycles of the reception periods according to the sensed ambient light level.

10. The apparatus of claim 9, wherein said first and second optical signals are at wavelengths in a range comprising the visible, ultraviolet, and infrared spectrums.

11. The apparatus of claim 9, wherein the light pipe is covered by a translucent lens or cover to provide for at least one of filtering, shading and dispersion.

12. The apparatus of claim 9, wherein said transceive processor is configured to direct said transmit element to transmit optical data in the first optical signal at a first bit rate faster than a second bit rate of said second optical signal.

13. The apparatus of claim 9, wherein the apparatus includes a first device, and the second optical signal is received from a second device and includes an optical commissioning data stream for configuring the first device for operation.

14. The apparatus of claim 9, wherein the apparatus is configured to operate with a data encoding scheme in which transmitter off periods are interpreted as a logical zero, and the first optical signal has a first bit rate substantially slower than a second bit rate of the second optical signal received by the receiving element.

15. A method for providing two-way optical communication in a shared light pipe, the method comprising:
 while, via a transmit element, transmitting a first optical signal through the shared light pipe:

suspending said transmitting during a plurality of reception periods, wherein each of the plurality of reception periods lasts for a respective duration of time, and occurs in the first optical signal at a respective duty cycle;

sensing by a receive element an ambient light level of the surrounding environment, wherein a transceive processor is configured to adjust the durations of time and the duty cycles of the reception periods according to the sensed ambient light level; and receiving by the receive element a second optical signal through the shared light pipe during one or more sampling intervals within each of said reception periods.

16. The method of claim 15, wherein an optical barrier is coupled to the light pipe, and configured to at least partially isolate transmit and receive optical paths within split portions of the light pipe.

17. The method of claim 15, wherein said transceive processor directs said transmit element to transmit optical data in the first optical signal at a first bit rate faster than a second bit rate of said second optical signal.

18. The method of claim 15, wherein for said each of the plurality of reception periods, the respective duration of time is no greater than a first threshold value, and the respective duty cycle is no greater than a second threshold value.

19. The method of claim 18, wherein the first bit rate of the first optical signal is at least 10 times of the second bit rate of the second optional signal.

20. The method of claim 15, wherein the apparatus operates with a data encoding scheme, and the first optical signal has a first bit rate substantially slower than a second bit rate of the second optical signal received by the receiving element.

* * * * *